(12) United States Patent
Xin et al.

(10) Patent No.: US 7,580,956 B1
(45) Date of Patent: Aug. 25, 2009

(54) SYSTEM AND METHOD FOR RATING RELIABILITY OF STORAGE DEVICES

(75) Inventors: Qin Xin, Mountain View, CA (US); Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 265 days.

(21) Appl. No.: 11/418,358

(22) Filed: May 4, 2006

(51) Int. Cl.
*G06F 17/30* (2006.01)

(52) U.S. Cl. .......................... 707/200; 700/21

(58) Field of Classification Search ........................ None
See application file for complete search history.

(56) References Cited

U.S. PATENT DOCUMENTS

| | | | |
|---|---|---|---|
| 4,707,796 A | 11/1987 | Calabro et al. | |
| 5,557,183 A * | 9/1996 | Bates et al. | 318/434 |
| 6,249,887 B1 | 6/2001 | Gray et al. | |
| 6,982,842 B2 * | 1/2006 | Jing et al. | 360/31 |
| 7,136,768 B1 * | 11/2006 | Shah et al. | 702/115 |
| 2003/0046615 A1 * | 3/2003 | Stone | 714/47 |
| 2005/0160189 A1 * | 7/2005 | McNeill et al. | 710/1 |
| 2006/0050629 A1 | 3/2006 | Nobuyuki | |
| 2006/0248272 A1 * | 11/2006 | del Rosario et al. | 711/114 |
| 2007/0050543 A1 * | 3/2007 | Pomerantz | 711/114 |

* cited by examiner

*Primary Examiner*—Charles Rones
*Assistant Examiner*—Yuk Ting Choi
(74) *Attorney, Agent, or Firm*—Robert C. Kowert; Meyertons, Hood, Kivlin, Kowert & Goetzel, P.C.

(57) ABSTRACT

A method for rating reliability of storage devices is disclosed. A reliability rating for a group of storage devices is assigned to a first rating. The first rating indicates an expected reliability that is the same for each individual one of the storage devices in the group. The expected reliability provides an indication of how reliable the storage devices in the group are expected to be. Information indicating one or more operational characteristics for one or more of the storage devices in the group may be periodically received and analyzed to determine whether the reliability rating for the group of storage devices should be changed. If so then the reliability rating for the group is changed to a different rating, e.g., to indicate either a decrease or an increase in the expected reliability of the storage devices in the group.

20 Claims, 10 Drawing Sheets

SYSTEM AND METHOD FOR RATING RELIABILITY OF STORAGE DEVICES

BACKGROUND OF THE INVENTION

1. Field of the Invention

This invention relates to storage systems that include a plurality of storage devices. More particularly, the invention relates to a method for assigning a reliability rating for a group of storage devices based on information indicating one or more operational characteristics of the storage devices in the group.

2. Description of the Related Art

Computer systems use storage devices such as disk drives to store data. The amount of data businesses and individuals store keeps increasing. This results in use of larger capacity storage devices and an ever growing number of these storage devices. Some large-scale storage systems use hundreds or thousands of disk drives to store large amounts of data. Disk drives are prone to failures that can cause the stored data to be permanently lost or else require considerable time and effort to recover the data. In a large-scale storage system with many disk drives, there is a high likelihood of multiple disk drive failures. The larger capacity of the storage devices makes data loss and/or, recovery as a result of a failure more expensive. Also, the larger number of devices increases probability that more of those devices will fail. Therefore, it is desirable to predict disk drive failures before they occur so that preventative measures against data loss can be taken.

Most existing methods for predicting disk drive failure focus on predicting failure of an individual disk drive by analyzing that disk drive's behavior. In other words, these methods analyze various aspects of a particular disk drive's behavior and attempt to find signs indicating that that particular disk drive is likely to fail. However, studies have shown that a majority of disk drive failures occur without any warning or predictive signs.

SUMMARY

Various embodiments of a method for rating reliability of storage devices are described. According to one embodiment of the method, a reliability rating for a group of storage devices may be assigned to a first rating value. The group of storage devices includes a plurality of storage devices, and the first rating value indicates an expected reliability that is the same for each individual one of the storage devices in the group. The method further comprises receiving first information indicating one or more operational characteristics for one or more of the storage devices in the group. The reliability rating value for the group of storage devices may be changed to a second rating value different from the first rating value in response to the first information.

BRIEF DESCRIPTION OF THE DRAWINGS

A better understanding of the invention can be obtained when the following detailed description is considered in conjunction with the following drawings.

Figure 1:
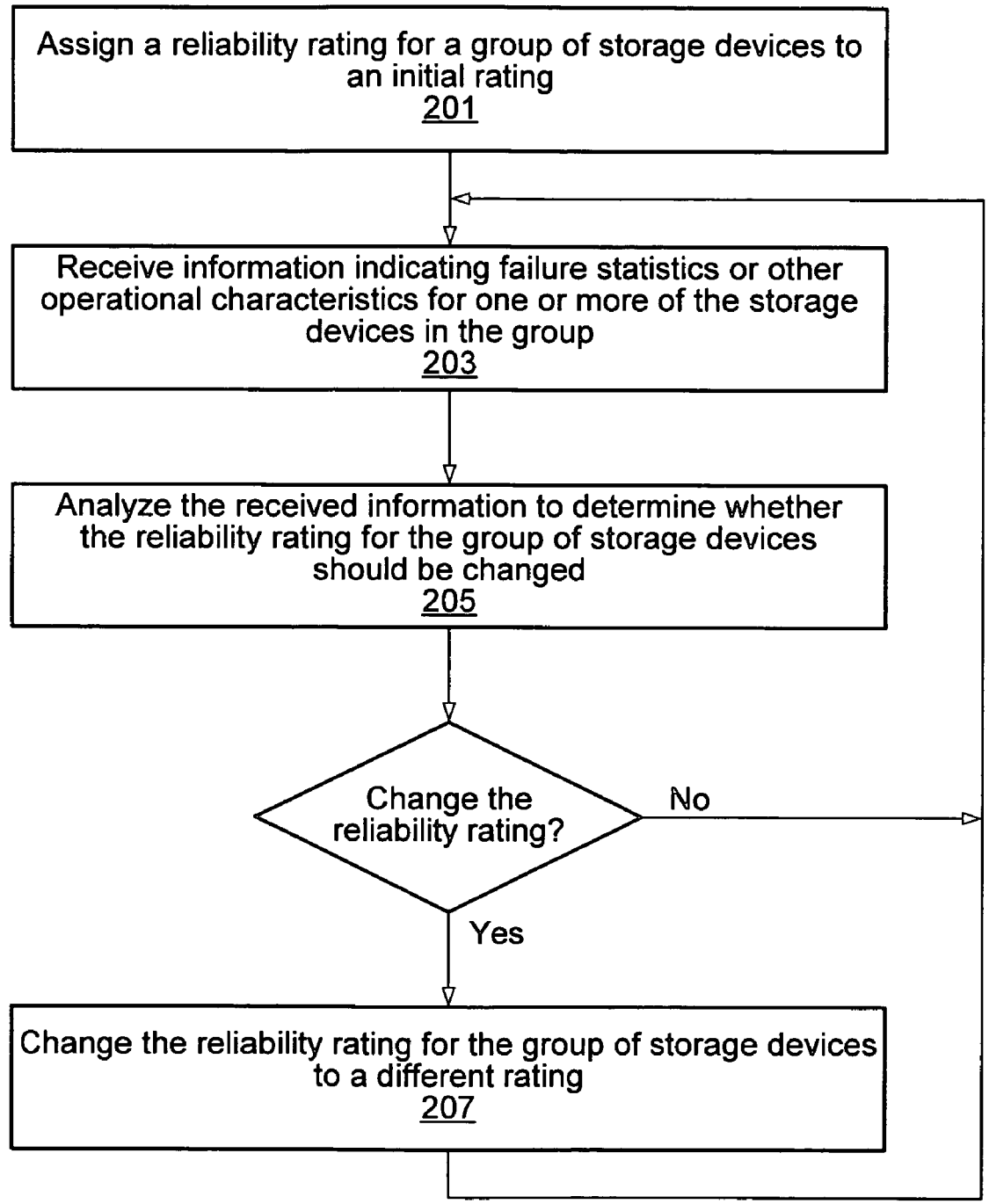
FIG. 1 is a flowchart diagram illustrating one embodiment of a method for rating reliability of storage devices.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a method for rating reliability of storage devices are described herein. As used herein, the term "storage device" refers to a device operable to store data. Examples of storage devices include disk drives, tape drives, optical drives, and solid state storage devices. In some embodiments described herein, a storage device may be a mass storage device for persistently storing data, e.g., as opposed to the volatile operating memory of a computer system.

As described in more detail below, the storage devices may be logically grouped into different storage device groups. A reliability rating may be assigned to each group. For example, a given group of storage devices may include a plurality of storage devices, where the reliability rating for the group indicates an expected reliability for each of the storage devices in the group, e.g., indicates an expected reliability that is the same for each individual one of the storage devices in the group. The expected reliability may provide an indication of how reliable the storage devices are expected to be, e.g., an indication of how likely it is that the storage devices will operate without experiencing a significant failure.

The storage devices may be grouped together based on common characteristics shared by the storage devices. In particular, storage devices in a given group may share common characteristics that affect the reliability of the storage devices. For example, as discussed below, in one embodiment storage devices may initially be grouped together if they are from the same manufacturing batch, since storage devices from the same manufacturing batch often have similar reliabilities. As the storage devices operate over time, various deployment characteristics that affect the expected reliabilities of the respective storage devices may be monitored, such as operating temperature, amount of power-on time, the number of I/O operations performed, etc. A given storage device may be re-assigned to a different group if it significantly differs from the other storage devices in its group in one or more of these characteristics. Thus, a given storage device group may effectively be maintained as a "peer group" such that the storage devices in the group are similar to each other in terms of characteristics that affect the reliability of the storage devices.

The method may also operate to monitor various operational characteristics of the storage devices over time in order to determine whether the reliability ratings for the storage device groups should be changed, e.g., either decreased or increased. For example, failure statistics or other operational characteristics for the storage devices may be monitored. For each storage device group, information indicating the failure statistics or other characteristics of the storage devices in the group may be periodically or aperiodically analyzed to determine whether the reliability rating for the storage device group should be changed, as described in detail below.

In some cases, the reliability rating for an entire group of storage devices may be decreased even if only a subset of the storage devices have experienced failures. Thus, the expected reliability rating for a particular storage device in the group may be lowered even if there is no sign of any problem with that storage device, e.g., even if the operational information indicates that the storage device has not experienced a failure. Thus, various embodiments of the method are somewhat analogous to an actuarial model for predicting storage device failures. Since storage devices in a peer group share certain characteristics that affect the expected reliability of the storage devices, a statistically significant number of storage device failures within the group may indicate an increased probability that other storage devices in the group will soon begin to fail, even if the other storage devices have not yet shown any signs of impending failure. Thus, the expected reliability rating for the entire group of storage devices may be decreased if a statistically significant number of storage device failures within the group is detected.

As described in more detail below, the reliability ratings for the storage device groups may be used in various ways. For example, in one embodiment, storage management software may use the reliability rating information to automatically change a storage configuration of the system in various ways, e.g., in order to reflect a decrease or increase in the expected reliability of storage devices in a particular group. In another embodiment the storage management software may use the reliability rating information to decide which storage device to select for performing a particular I/O operation or to decide which storage device to select for storing a particular portion of data, e.g., depending on a level of storage device reliability needed for the I/O operation or depending on how critical the data is.

Referring now to FIG. 1, a flowchart diagram illustrating one embodiment of a method for rating reliability of a group of storage devices is illustrated. In 201, the reliability rating for the group of storage devices is assigned to an initial reliability rating. For example, the group of storage devices may comprise a new group of storage devices that are newly deployed at or near the same time.

In various embodiments, reliability ratings may be represented in any of various ways, and there may be any desired number of possible ratings. For example, in one embodiment, there may be a set of three reliability ratings, such as "low", "medium", and "high". As another example, there may be a set of two ratings, such as "less reliable" and "more reliable". In another embodiment, the reliability rating may be assigned as an integer, e.g., between 0 and N, where N is any desired integer. For example, lower integers may represent lower expected reliabilities, and higher integers may represent higher expected reliabilities. In another embodiment, the reliability rating may be assigned as a fraction or floating point number.

In one embodiment the group of storage devices may be assigned a relatively low reliability rating as the initial reliability rating in 201. For example, where the storage devices comprise new storage devices, the relatively low rating may reflect the well-known "infant mortality" commonly exhibited by new storage devices, i.e., a relatively high probability of failure in the early stages of operation of the new storage devices. As described below, the reliability rating for the group of storage devices may later be increased if the storage devices in the group operate in a stable manner. In other embodiments, the initial reliability rating for the group may be average or high, e.g., for storage devices that have gone through a pre-deployment "burn-in" process.

In 203, information indicating failure statistics or other operational characteristics for one or more of the storage devices in the group is received. As used herein, the term "operational characteristic" may refer to any characteristic of a storage device related to its operation or usage. For example, after the reliability rating for the group is assigned to the initial rating, the storage devices in the group may operate for some period of time. The received information may indicate failures that have occurred on storage devices in the group and/or may indicate various other types of operational characteristics regarding the operation or usage of individual ones of the storage devices in the group. The information received in 203 is also referred to below as "operational information".

In 205, the received operational information is analyzed to determine whether the reliability rating for the group of storage devices should be changed, e.g., to indicate either a decrease or increase in the expected reliability for the storage devices in the group. If so, then the reliability rating for the group of storage devices is changed to a different rating in 207.

For example, the operational information may comprise failure information indicating failures that have occurred on the storage devices in the group. If the storage devices in the group have experienced a fewer than expected number of failures after they have operated for a threshold amount of time after their initial deployment then the reliability rating for the group may be increased from a relatively low initial rating to a higher rating. Conversely, if the storage devices in the group have experienced a greater than expected number of failures then the reliability rating for the group may be set to an even lower rating than the initial rating.

As indicated by the flowchart arrow returning to 203, blocks 203, 205 and 207 may be performed multiple times in some embodiments. For example, operational information indicating failure information or other operational characteristics for the storage devices in the group may be periodically (or aperiodically) received and analyzed to determine whether the reliability rating for the group of storage devices should be changed. In a typical embodiment, the analysis of the operational information and rating of the storage device group may require little computational and space overhead.

In various embodiments the operational information for the storage devices may be received at any desired frequency or manner with respect to time. In some embodiments the operational information may be monitored continuously or substantially continuously. In other embodiments the operational information may be gathered less often. The accuracy of the reliability rating for the group of storage devices may depend on how much relevant operational information can be gathered for each storage device. More aggressive monitoring and gathering of operational information may lead to higher confidence in the reliability rating, but may result in higher overhead for the system. In some embodiments it may be desirable to gather as much operational information (e.g., as much failure information and/or other operational characteristics) as possible for each storage device and/or to gather the reliability characteristics in a continuous or frequent manner, e.g., to obtain a more accurate reliability rating. In other embodiments it may be desirable to gather less operational information and/or to gather the operational information less often, e.g., to reduce system overhead.

As described below, a user (e.g., system administrator) may be able to specify criteria regarding how much operational information to gather, what kinds of operational information to gather, and/or how often to gather the operational information, e.g., by interacting with a configuration graphical user interface (or command line interface (CLI) or application programming interface (API)). Also, in some embodiments, the system may be operable to automatically adjust the monitoring of the operational information in response to various conditions. For example, when the system is heavily loaded or fewer resources are available then fewer monitoring processes may be executed. The user may also specify criteria affecting how the system adjusts the monitoring of the operational information in response to the system load.

It is possible that the reliability rating for the storage device group may change multiple times over time. As one exemplary scenario, it is possible that the group is initially assigned a relatively low initial reliability rating. Near the beginning of their deployment, some of the storage devices in the group may experience significant failures. These failures may possibly be considered to be statistically significant enough to cause the reliability rating of the group to be changed to an even lower rating, e.g., depending on the number of failures (or failed storage devices) and the particular reliability rating criteria used, as described below. The failed storage devices may possibly be removed from operation. If the remaining storage devices are able to operate for some threshold period of time without experiencing a significant number of failures or with fewer than an expected number of failures then the reliability rating for the storage device group may subsequently be increased.

As mentioned above, in some embodiments the operational information received in 203 may include failure information for one or more of the storage devices in the group, e.g., information indicating failures that have occurred on the one or more storage devices. In one embodiment, for each storage device in the group, the operational information may indicate failures that have occurred on the storage device, if any. In another embodiment the operational information may include failure information for only a subset of the storage devices in the group.

In various embodiments, the failure information may indicate any of various kinds of failure or error statistics for the storage devices in the group. For example, the failure information may indicate whether various types of I/O failures, e.g., read operation failures and/or write operation failures, have occurred on the storage devices, as well as possibly indicating the number of failures that have occurred on each storage device. The failure information may also indicate whether any of the storage devices have experienced hardware failures or have failed completely. Other examples of failures that may be indicated by the failure information include internal device diagnostic failures and checksum failures.

In other embodiments, the operational information received in 203 may include information indicating other types of operational characteristics of the storage devices in addition to or instead of failure information. The operational information may indicate or characterize any of various aspects of operation of the storage devices in the group. For example, the operational information may indicate various kinds of information considered to have an effect on the expected reliability of the storage devices, such as the total amount of operating time or power-on time for each storage device, the number of read operations that each storage device has performed, the number of write operations that each storage device has performed, operating temperature of each storage device, etc. The operational information may also include information regarding hardware states or conditions of the storage devices. For example, where the storage devices comprise disk drives, the operational information may specify head flying height, spin-up time, surface state, or other information regarding the disk drive hardware.

In various embodiments, any desired algorithm or heuristic or any desired rating criteria may be utilized in order to determine whether the reliability rating for the group of storage devices should be changed based on the received operational information. The particular algorithm or heuristic that is used may depend on the type of operational information. For example, where the operational information includes failure statistics for the storage devices, the method may operate to determine whether the reliability rating for the group of storage devices should be changed based on the failure statistics.

In one embodiment the failure statistics for the storage devices may be compared to expected failure statistics. For example, in one embodiment the expected failure statistics may be based on empirical data. If the actual failure statistics differ significantly from the expected failure statistics then the reliability rating for the group of storage devices may be changed accordingly. For example, if there is a significantly higher number of failures than expected or if a higher than expected percentage of the storage devices have experienced failures then the reliability rating for the group may be decreased. Similarly, if there is a significantly lower number of failures than expected or if a lower than expected percentage of the storage devices have experienced failures then the reliability rating for the group may be increased.

As described in more detail below, a user (e.g., system administrator) may be able to set or adjust criteria for determining whether the reliability rating for the group of storage devices should be changed based on the received operational information. For example, the user may specify information indicating expected failure statistics or information indicating threshold values by which the actual failure statistics must differ from the expected failure statistics in order to cause the reliability rating for the group of storage devices to be changed. The user may also specify any of various other kinds of information affecting the algorithm or heuristic used to determine the reliability rating.

As mentioned above, in some cases, the reliability rating for the entire group of storage devices may be lowered even if only a subset of the storage devices have experienced failures. As discussed above, the reliability rating for the storage device group indicates the expected reliability for each one of the storage devices in the group. In some embodiments, the reliability rating for the entire group may be lowered even if the operational information indicates a reliability risk or problem for only a single storage device within the group. Thus, the expected reliability rating for a particular storage device in the group may be lowered even if there is no sign of any problem with that storage device, e.g., even if the operational information indicates that the storage device has not experienced a failure.

Figure 2:
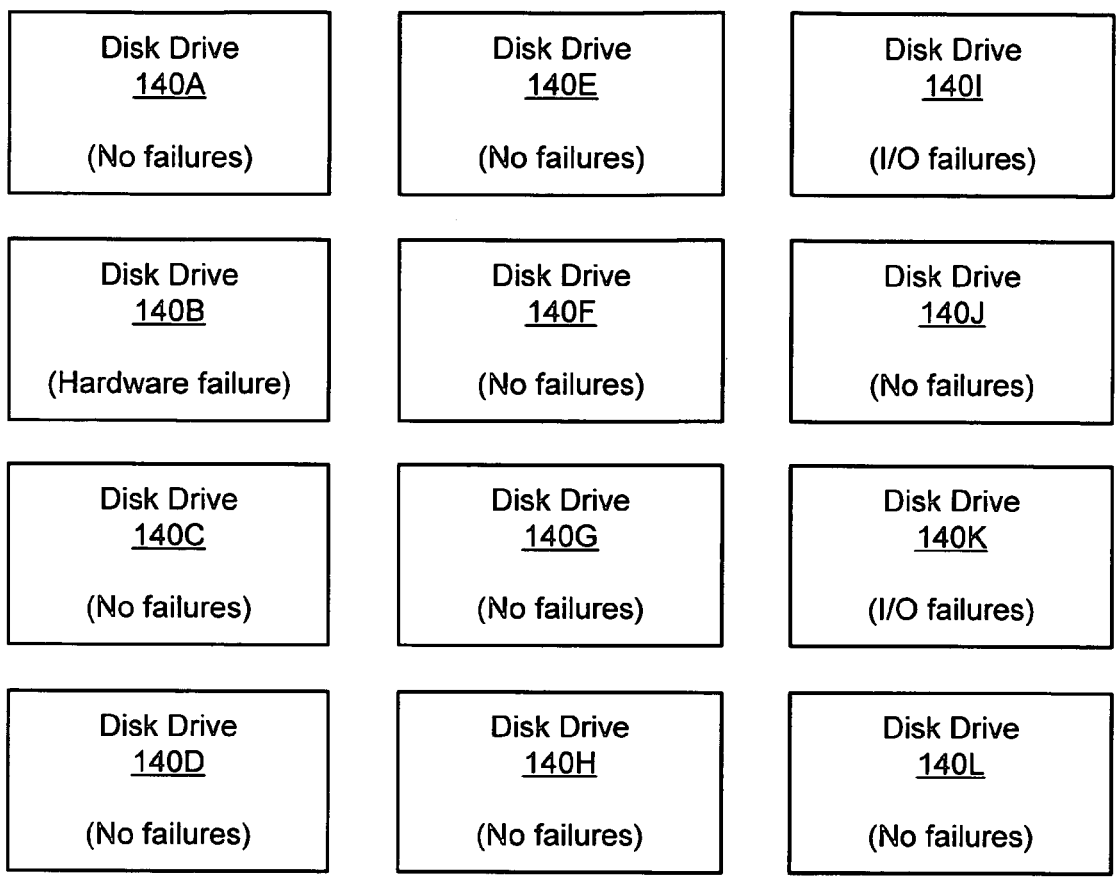
FIG. 2 illustrates an exemplary group of storage devices comprising a plurality of disk drives and indicates failures that have occurred on each of the disk drives, according to one embodiment.

For example, FIG. 2 illustrates an exemplary group of storage devices comprising a plurality of disk drives 140A-140L. The disk drives 140 may initially be grouped together because they come from the same manufacturing batch and/or because they share other characteristics that can affect their reliability. As described above, failure information or other operational characteristics of the disk drives 140 may be monitored over time. FIG. 2 indicates failures (if any) that have occurred on each of the disk drives 140.

In this example, disk drive 140B has experienced a hardware failure, and disk drives 140I and 140K have experienced I/O failures. The other disk drives 140 have not experienced any failures (or have not experienced any kind of failures which are taken into account in the determination of whether to change the group's reliability rating). As discussed above, the failures on the disk drives 140B, 140I, and 140K may or may not be considered statistically significant enough to cause the reliability rating for the storage device group to be decreased or increased, depending on the particular algorithm or heuristic used to set the group's reliability rating or the particular rating criteria used. Assuming that the failures on these three disk drives are considered significant enough to trigger a decrease in the group's reliability rating, then the reliability rating for the entire group of storage devices may be lowered even though most of the disk drives 140 have not had a failure.

In embodiments where the operational information indicates reliability characteristics for the storage devices other than failure information, the method may operate to determine whether the reliability rating for the group of storage devices should be changed based on these reliability characteristics. As one simple example, if the amount of operating time for the storage devices has passed a threshold level then the reliability rating of the storage device group may be changed to a lower rating to indicate that there is an increased probability that storage devices in the group will fail. As described below, in one embodiment, if storage devices in the group have diverged from each other in terms of their operating time or other reliability characteristics then the storage devices may be separated into different groups. Thus, in this example, only the subset of storage devices whose operating time amounts have passed the threshold level may be flagged with lower reliability ratings.

In some embodiments, the determination of whether to change the reliability rating for the group may be based on both failure statistics and other types of operational information. For example, if the amount of operating time for the storage devices in the group has passed a threshold level then fewer failures may be required in order to cause the reliability rating for the group to be lowered.

As noted above, in one embodiment, a user (e.g., system administrator) may be able to specify criteria affecting the determination of whether to change the reliability rating for the group. For example, as described below, software may execute to display a graphical user interface that enables the user to select various options or set parameters that affect the reliability rating.

The method of FIG. 1 may be utilized in any type of storage system that includes a plurality of storage devices. FIGS. 3A-3D illustrate exemplary embodiments of systems in which the method may be used.

Figure 3A:
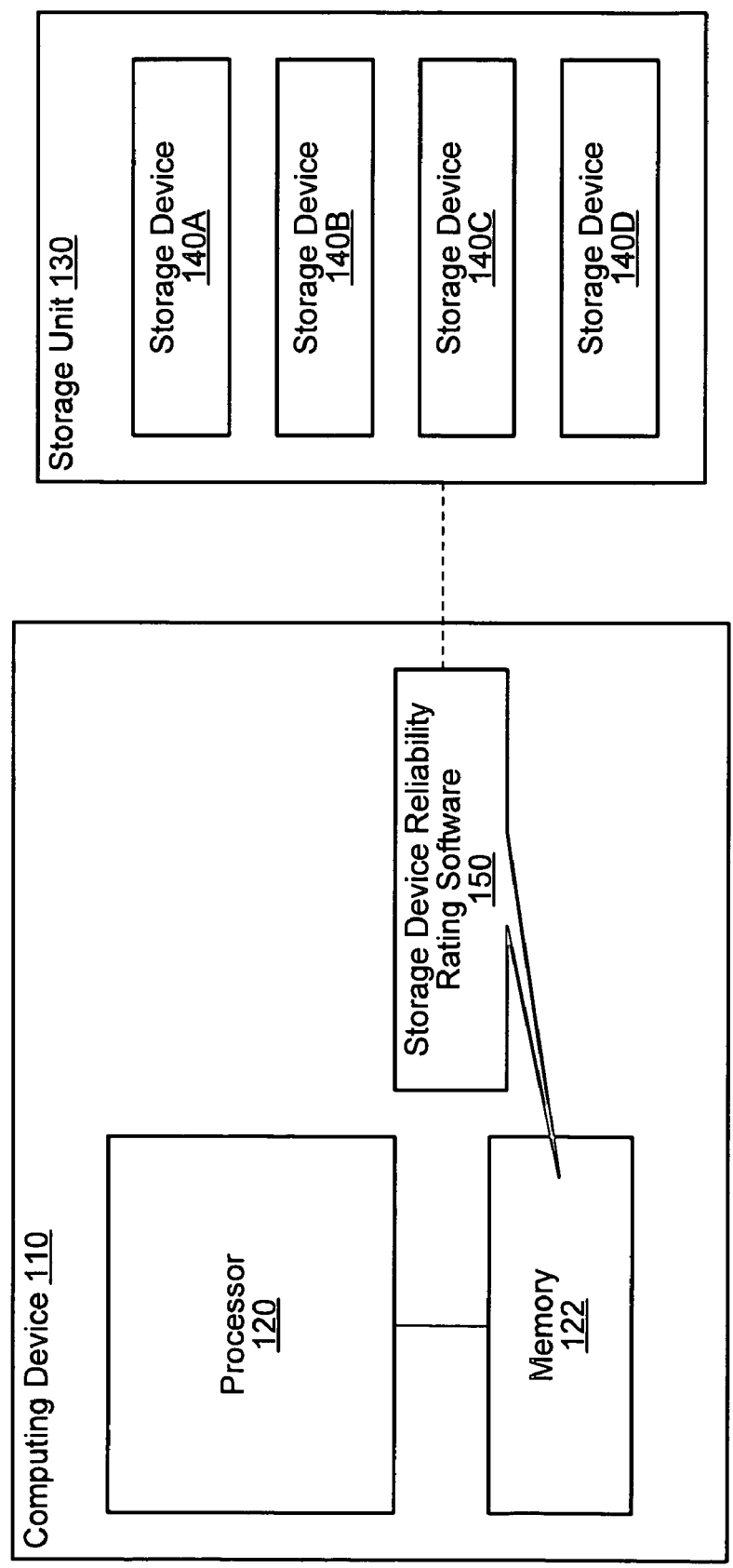
FIGS. 3A-3D illustrate exemplary embodiments of systems in which the method of FIG. 1 may be used.

The method of FIG. 1 may be implemented in software that automatically performs the operations described above. For example, FIG. 3A illustrates an exemplary computing device 110. The computing device 110 includes a processor 120 coupled to a memory 122. The memory 122 may be configured to store program instructions and/or data. In particular, the memory 122 may store storage device reliability rating software 150. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The processor 120 may be configured to execute program instructions and to operate on data stored within the memory 122. In particular, the processor 120 may execute the storage device reliability rating software 150. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the computing device 110 may include multiple processors 120.

The exemplary system of FIG. 3A also includes a plurality of storage devices 140. At least a subset of the storage devices 140 may be grouped together into a storage device group, as described above. The processor 120 may execute the storage device reliability rating software 150 in order to perform the operations described above with respect to the method of FIG. 1. For example, the storage device reliability rating software 150 may execute to assign an initial reliability rating for the storage device group, receive operational information for one or more of the storage devices in the group, analyze the operational information to determine whether the reliability rating for the storage device group should be changed, and if so, then change the reliability rating for the storage device group to a different rating.

As described above, the storage device reliability rating software 150 may repeatedly, e.g., periodically or aperiodically, receive operational information for the storage devices 140 in the group and analyze the operational information to determine whether the reliability rating for the group should be changed. As described below, the storage device reliability rating software 150 may also periodically or aperiodically analyze reliability characteristics of the storage devices in the group to determine whether one or more of the storage devices should be re-assigned to other groups.

It is noted that the storage devices 140 may be grouped into multiple storage device groups. For example, in one embodiment the storage devices 140 may be grouped into a plurality of peer groups, where the storage devices in each peer group are from the same manufacturing batch and/or share other common characteristics that affect the reliability of the storage devices. The storage device reliability rating software 150 may periodically or aperiodically monitor each of the storage groups to determine whether to change the reliability ratings for the groups and/or to determine whether to re-assign storage devices to different groups.

In some embodiments the storage device reliability rating software 150 may be distributed across multiple computing devices 110, or different storage device groups may be managed by storage device reliability rating software 150 executing on different computing devices 110.

In various embodiments, the storage device reliability rating software 150 may receive operational information for the storage devices 140 or information indicating reliability characteristics for the storage devices 140 using any of various techniques, e.g., depending on the type of storage devices 140 used in the system. In one embodiment the storage device reliability rating software 150 may communicate with the storage devices 140 or may communicate with a storage unit 130 in which the storage devices 140 are included in order to receive at least a portion of the operational information.

For example, in one embodiment the storage devices 140 may comprise disk drives, where each of the disk drives includes Self-Monitoring Analysis and Reporting Technology (SMART) circuitry. The storage device reliability rating software 150 may communicate with the SMART circuitry via a programming interface in order to receive information from each disk drive, such as the drive's read error rate, power-on hours, operating temperature, or other characteristics.

Figure 3B:
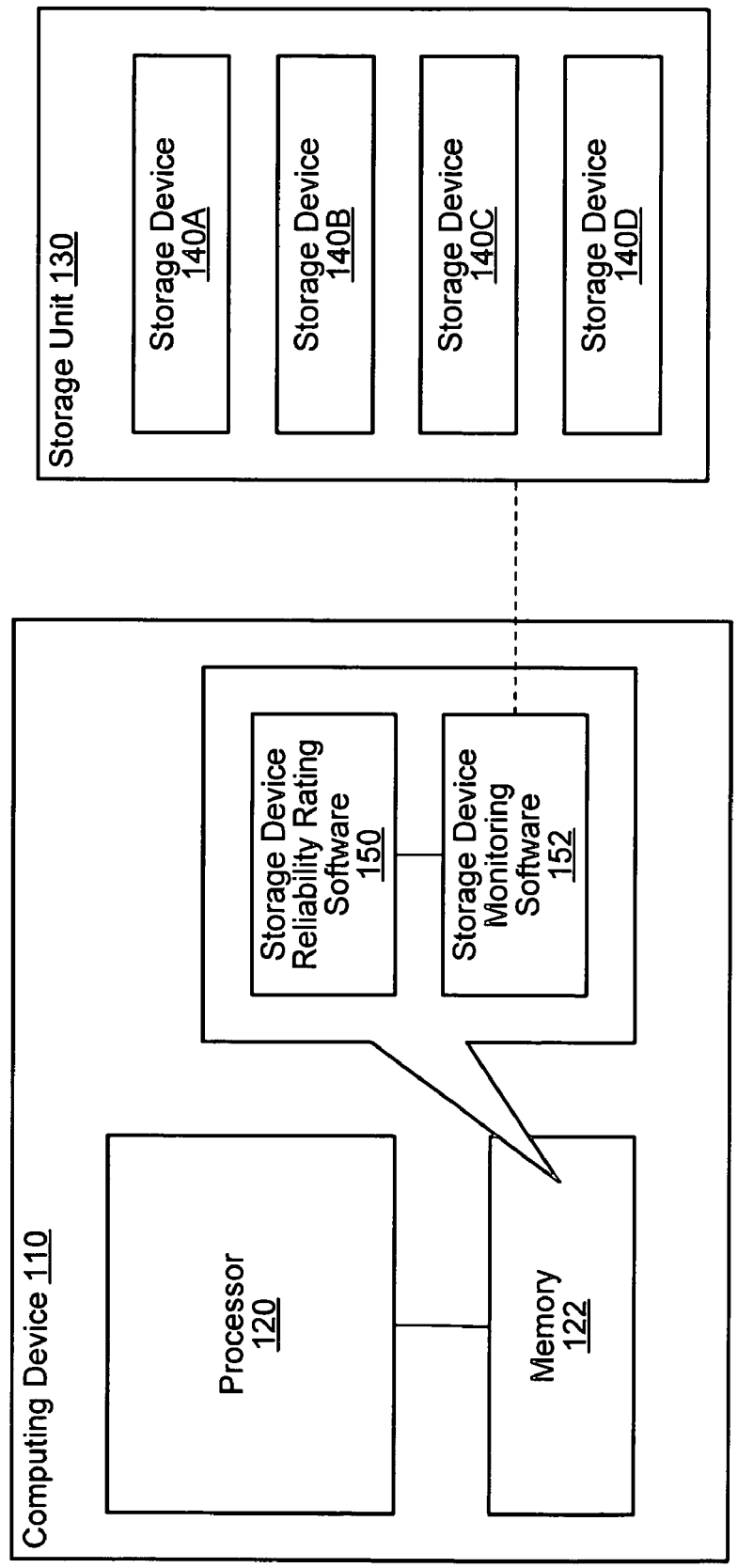

In one embodiment, the storage device reliability rating software 150 may receive at least a portion of the information regarding the storage devices 140 by communicating with other software tools. For example, FIG. 3B illustrates an embodiment in which the storage device reliability rating software 150 communicates with storage device monitoring software 152 executing on the computing device 110. In other embodiments the storage device reliability rating software 150 may communicate with storage device monitoring software 152 executing on one or more other computing devices instead of or in addition to the computing device 110.

In various embodiments, the storage device monitoring software 152 may provide the storage device reliability rating software 150 with any kind of information regarding the storage devices 140, e.g., depending on the kind of storage devices 140. As one example, the storage device monitoring software 152 may monitor the storage devices 140 to determine whether they are performing various types of I/O operations or other operations correctly and may provide the storage device reliability rating software 150 with information indicating the correctness of the operations performed by the storage devices 140.

Figure 3C:
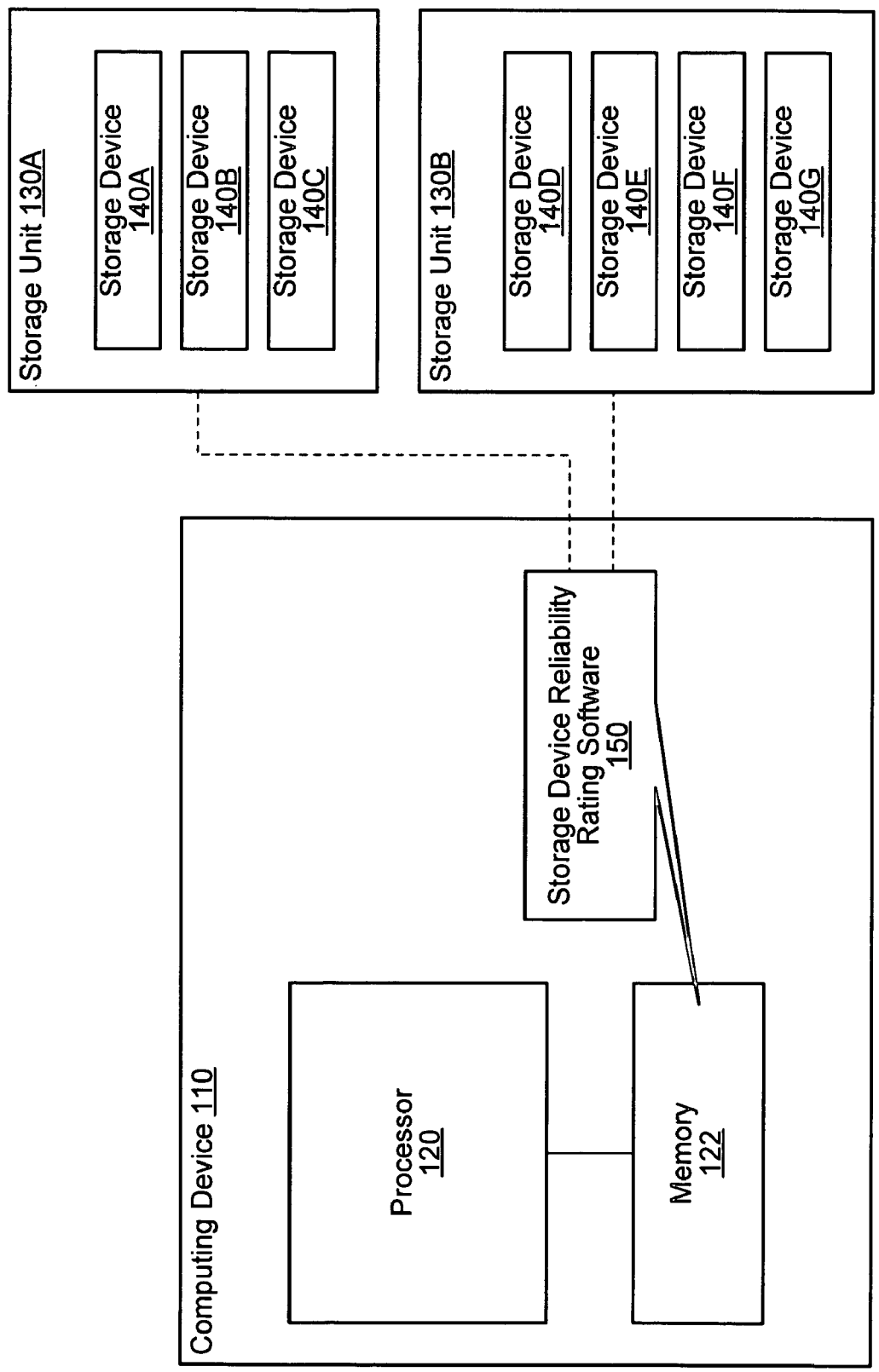
Figure 3D:
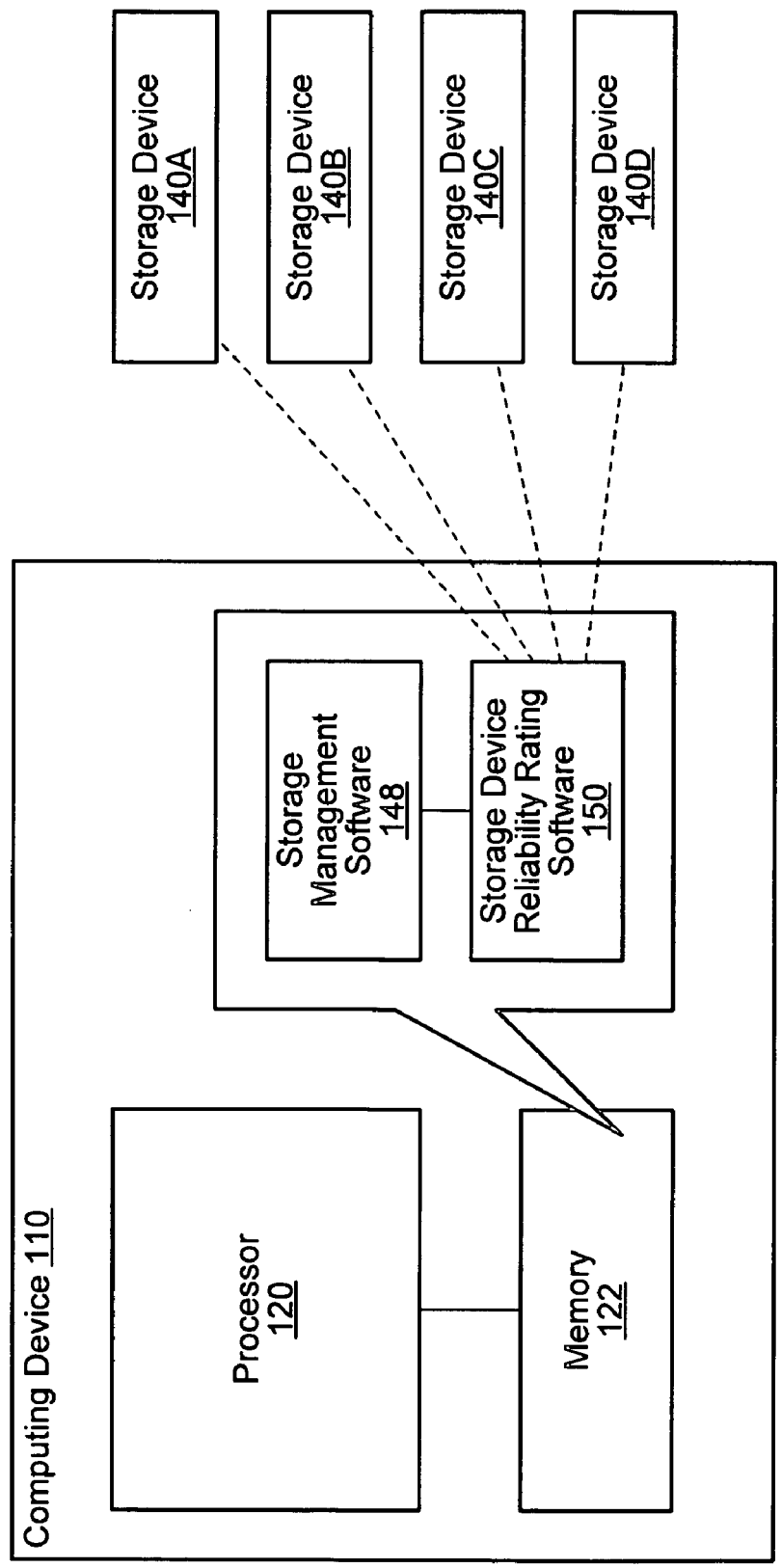

In the examples of FIGS. 3A and 3B, the storage devices 140 are located together in a storage unit 130. The computing device 110 may couple to the storage unit 130 in various ways, such as through a communication bus, cable, or network (e.g., local area network, wide area network, storage area network, etc.). As used herein, the term "storage unit" may refer to any kind of device operable to include one or more storage devices. In another embodiment the computing device 110 may couple to the storage devices 140 directly, e.g., where the storage devices 140 are not included in a storage unit, e.g., as shown in FIG. 3D. In one embodiment the storage devices 140 may be located in the computing device 110.

It is noted that a group of storage devices 140 such as described herein may represent a logical grouping of the storage devices, which may or may not correspond to a physical grouping or deployment of the storage devices. For example, storage devices in a group may be geographically or spatially located either close to or far from each other. FIG. 3C illustrates an embodiment in which the computing device 110 couples to a plurality of storage units 130. A storage device group may include storage devices 140 from one or more of the storage units 130. For example, a storage device group may include the storage devices 140A, 140C, 140F and 140G. In other embodiments, the storage devices 140 that are included in a storage device group may be deployed as individual storage devices 140, e.g., where the storage devices 140 are not included in a storage unit 130.

It is also noted that in some embodiments, a storage unit 130 which includes multiple storage devices may be treated as a single storage device for the purpose of grouping. For example, if multiple storage arrays (each including multiple disk drives, for example) are deployed in a storage network, a peer group of storage devices as described herein may include multiple ones of the storage arrays that are expected to have similar reliability, where reliability is considered for each storage array as a whole. In general, the term "storage device" may refer to an individual storage component or a device or system that includes multiple individual storage components. In most embodiments a group will be of an homogenous storage device type (e.g. all group members are disk drives, or all group members are storage arrays), but in some embodiments a group may include heterogeneous storage device types, for example, where there is an expected reliability correlation between particular members of different storage device types.

Information indicating the reliability ratings for various storage device groups may be utilized in any of various ways. In one embodiment the reliability rating information may be displayed in a graphical user interface or printed in a report viewable by a user, e.g., a system administrator. For example, the system administrator may make decisions on whether to replace storage devices or purchase new equipment based on the reliability ratings. As described below, the system administrator may also reconfigure the system in various ways based on the reliability ratings.

In another embodiment, information indicating the reliability ratings for the storage device groups may be used to automatically perform various storage management operations. For example, FIG. 3D illustrates an embodiment in which storage management software 148 communicates with the storage device reliability rating software 150, e.g., to receive information indicating the storage device groups and their respective reliability ratings. As described below, the storage management software 148 may use this information to automatically change a storage configuration of the system in various ways, e.g., in order to reflect a decrease or increase in the expected reliability of storage devices in a particular group. The storage management software 148 may also use the reliability rating information to decide which storage device to select for performing a particular I/O operation or to decide which storage device to select for storing a particular portion of data, e.g., depending on a level of storage device reliability needed for the I/O operation or depending on how critical the data is.

It is noted that FIGS. 3A-3D are intended to be exemplary only, and the method of FIG. 1 may be utilized in any of various other systems. In general, the method of FIG. 1 may be utilized in any system (e.g., environment) that includes a plurality of storage devices.

It is also noted that the various portions of software described above, such as the storage device reliability rating software 150, storage device monitoring software 152, and storage management software 148, may have any type of software architectural relationships with each other and with other portions of software executing on the computing device 110 or other computing devices. The various portions of software may be implemented in one or more software applications, e.g., software products or suites sold by one or more vendors. In some implementations, storage device reliability rating software 150, storage device monitoring software 152, and storage management software 148 may be executing their functions on the computing device 110. In other implementations these components may be executing their functions on another computing device. In yet other implementations, where the storage unit 130 has sufficient resources and capabilities to execute some or all of the functionality of software components like 150, 152 and 148, some or all of the software components 148, 150 and 152 may execute on the storage unit 130.

For example, in one embodiment the storage device reliability rating software 150 may be implemented as a standalone utility with which other software interacts, such as file system software, volume manager software, or other storage management software. In other embodiments, the functionality of the storage device reliability rating software 150 may be integrated into other software products. For example, an operating system may be modified to include the storage device reliability rating software 150 as a part of the operating system, or the storage device reliability rating software 150 may be included as a part of another software application or product, such as file system software, volume manager software, or other storage management software.

Figure 4:
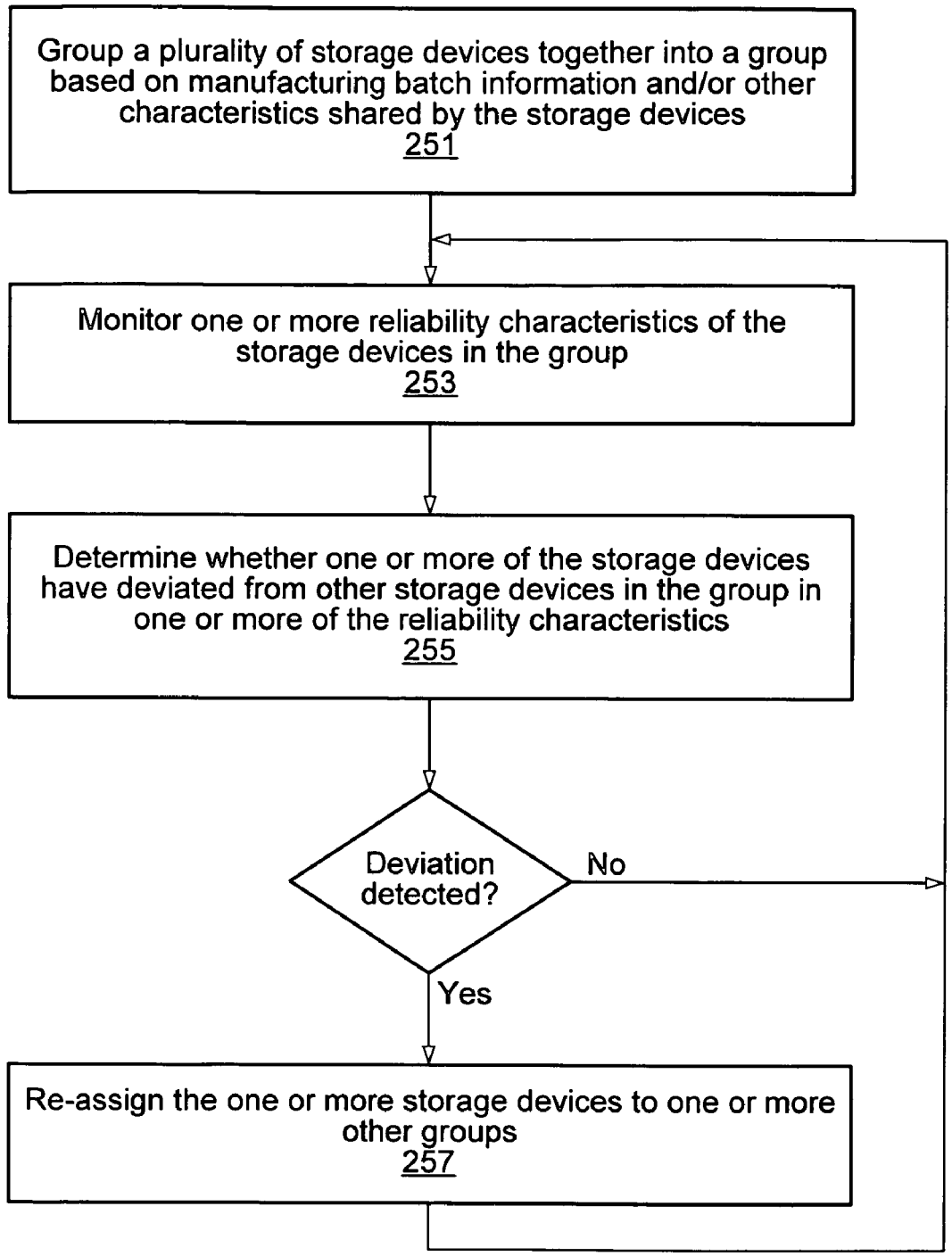
FIG. 4 is a flowchart diagram illustrating one embodiment of a method for forming and maintaining a group of storage devices.

As mentioned above, in some embodiments storage devices may be grouped together based on common characteristics shared by the storage devices. FIG. 4 is a flowchart diagram illustrating one embodiment of a method for forming and maintaining a group of storage devices. The method of FIG. 4 may be implemented in software, e.g., by the storage device reliability rating software 150.

In 251, a plurality of storage devices are grouped together into a storage device group. As described above, the storage device group may represent a logical grouping of the storage devices. Thus, grouping the storage devices together into the storage device group may simply comprise storing information representing the group and indicating which storage devices are in the group. The storage devices may be grouped together based on any desired criteria, such as one or more common characteristics shared by the storage devices. In particular, the storage devices may be grouped together based on common characteristics that affect the reliability of the storage devices. A characteristic of a storage device that affects the reliability of the storage device or that is considered to have a possible effect on the reliability of the storage device or otherwise forms a basis to treat storage devices as a group, is referred to herein as a "reliability characteristic". In various embodiments, any of the operational characteristics described herein as well as other characteristics may be used as reliability characteristics.

As one example, storage devices that belong to a common manufacturing batch often have similar reliabilities, e.g., due to manufacturing flaws (or lack thereof) common to each of the storage devices or similar materials used in each of the storage devices. Thus, in one embodiment a plurality of storage devices may be grouped together into a storage device group if they come from the same manufacturing batch. For example, newly deployed storage devices may initially be grouped into one or more groups based on their respective manufacturing batch information. As another example, storage devices which are already deployed in the system but which have not yet been assigned to a storage device group may be grouped into one or more groups based on their respective manufacturing batch information. In other embodiments, storage devices may be initially assigned into groups based on other reliability characteristics shared by the storage devices instead of or in addition to the manufacturing batch information.

In 253, one or more reliability characteristics of the storage devices in the group are monitored. For example, as described above, in one embodiment, storage device reliability rating software 150 may periodically receive information indicating the one or more reliability characteristics of the storage devices in the group. Examples of reliability characteristics that may be monitored include characteristics such as operating temperature of the storage device, the total number of read operations performed by the storage device, the total number of write operations performed by the storage device, the amount of time for which the storage device has been powered on, etc. In other embodiments, any of various other characteristics known to have an effect or considered to have a possible effect on the reliability of the storage devices may be monitored.

In 255, the method may operate to determine whether one or more of the storage devices have deviated from other storage devices in the group in one or more of the reliability characteristics. In various embodiments, any desired criteria or any desired algorithm or heuristic may be utilized to make this determination. As one simple example, for a given storage device, if the value of a particular reliability characteristic differs from an average value for the group by more than a threshold amount then the storage device may be determined to deviate from the group in that reliability characteristic. In one embodiment, determining whether one or more of the storage devices have deviated from other storage devices in the group in one or more of the reliability characteristics may include determining deviation in one or more operational parameters.

In one embodiment the user, e.g., system administrator, may be able to specify criteria affecting the determination of whether one or more of the storage devices have deviated from other storage devices in the group in one or more of the reliability characteristics, e.g., by interacting with a graphical user interface (or CLI or API) as described below. For example, for each reliability characteristic that is monitored, the user may specify a threshold amount or percentage used to make the determination.

If one or more of the storage devices are detected to have deviated from the group in one or more of the reliability characteristics then the one or more storage devices may be re-assigned to one or more other groups, as indicated in 257. Each of the one or more storage devices may be re-assigned to an existing storage group if there is a storage group that matches the storage device in its reliability characteristics, or new storage groups may be created if necessary.

As indicated by the flowchart arrow returning to 253, blocks 253, 255 and 257 may be performed multiple times, e.g., may be performed periodically or aperiodically. By periodically or aperiodically analyzing reliability characteristics of the storage devices in various storage device groups maintained by the system and re-grouping the storage devices if necessary, the method may operate to ensure that all of the storage devices in a given group are similar to each other in terms of their reliability characteristics. This may enable the method of FIG. 1 to operate effectively to rate the expected reliability for the entire group, as described above. In a typical embodiment, the analysis of the reliability characteristics and re-grouping of the storage devices may require little computational and space overhead.

In various embodiments the reliability characteristics for the storage devices may be received at any desired frequency or manner with respect to time. In some embodiments the reliability characteristics may be monitored continuously or substantially continuously. In other embodiments the reliability characteristics may be gathered less often. As described below, a user may be able to specify criteria regarding how much reliability characteristic information to gather, what kinds of reliability characteristics to gather, and/or how often to gather the reliability characteristics, e.g., by interacting with a configuration graphical user interface (or CLI or API). Also, in some embodiments, the system may be operable to automatically adjust the monitoring of the reliability characteristics in response to various conditions. For example, when the system is heavily loaded or fewer resources are available then fewer monitoring processes may be executed.

In some embodiments, some of the same operational characteristics that are used in determining the reliability rating of the group of storage devices may also be used as reliability characteristics in determining whether to keep the storage devices grouped together or to split them into multiple groups. As one example, in one embodiment the operating temperatures of the storage devices may be used to determining whether to keep the storage devices grouped together, e.g., by splitting subsets of the storage devices into different groups if the operating temperatures of the respective storage devices have diverged from each other. In this example, the operating temperatures of the storage devices may also be used as factors in rating the respective reliabilities of the groups (possibly in combination with other factors, such as failure statistics). Thus, in some embodiments, at least a portion of the operating characteristics used in the method of FIG. 1 may also be used as reliability characteristics in the method of FIG. 4. It is noted that in some embodiments the methods of FIG. 1 and FIG. 4 may be combined into a single method for both determining whether to keep the storage devices in a group grouped together and determining the appropriate reliability rating for the group(s).

Figure 5:
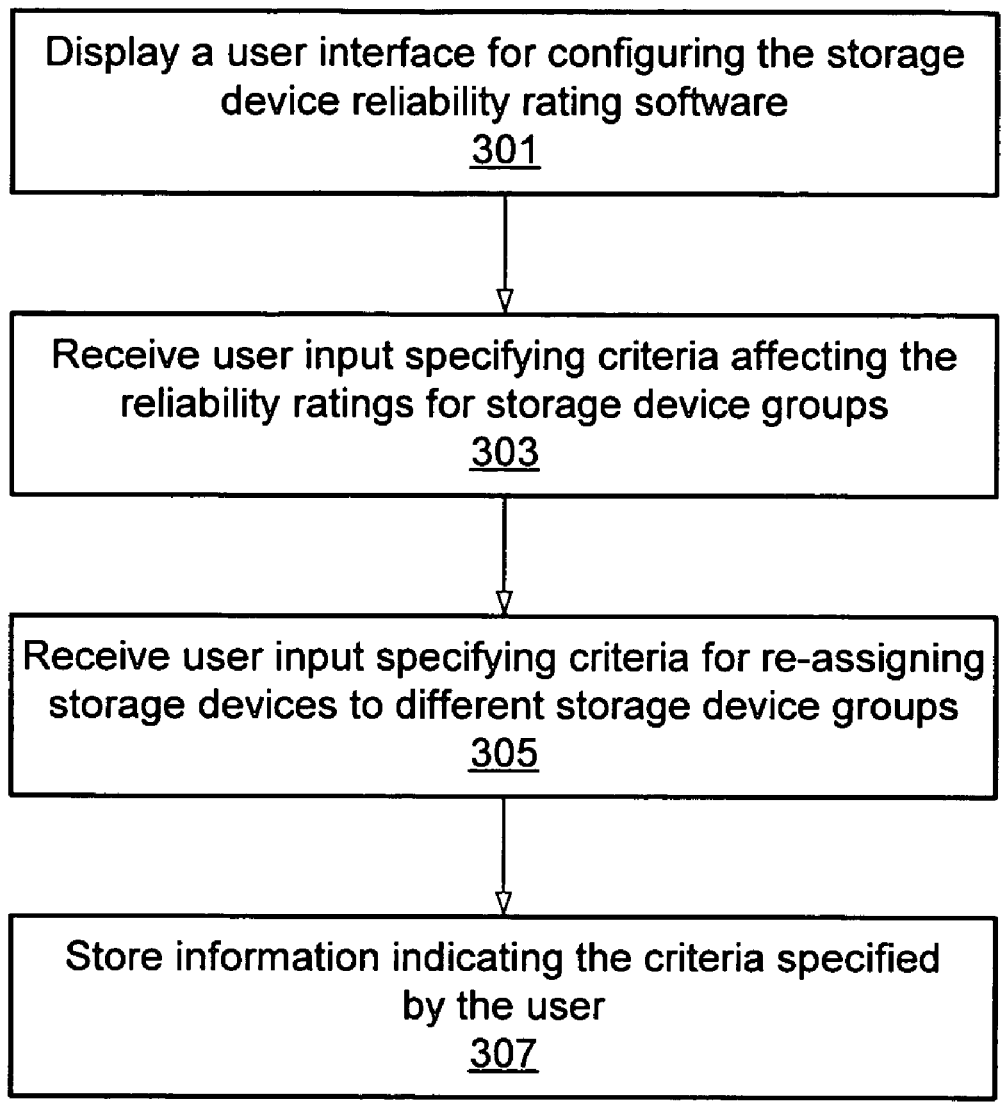
FIG. 5 is a flowchart diagram illustrating one embodiment of a method for receiving user input specifying criteria that affect the reliability ratings for storage device groups and/or criteria that affects the grouping of the storage devices.

As mentioned above, in some embodiments a user (e.g., a system administrator) may be able to specify information that affects the operation of the storage device reliability rating software 150. For example, as described above, the user may specify criteria that affect the reliability ratings for the storage device groups and/or criteria that affects the grouping of the storage devices. FIG. 5 is a flowchart diagram illustrating one embodiment of a method for receiving user input specifying these criteria.

In 301, a graphical user interface (GUI) for configuring the storage device reliability rating software is displayed. The GUI may be implemented in any of various ways. For example, the GUI may be a traditional windows-based GUI or may be a web-based GUI, e.g., may be displayed in a web browser window. In various embodiments, the functionality of displaying the GUI may be implemented by any of various kinds of software applications or components. For example, the GUI may be displayed by a stand-alone utility for configuring the storage device reliability rating software 150 with various types of information, such as described below. As another example, the GUI may comprise a part of an administration console user interface which is also used to configure various other aspects of storage management in addition to configuring the storage device reliability rating software 150.

The GUI may be displayed on a display device of a local computer system, e.g., may be displayed by local software executing on the local computer system. The local software that displays the GUI may communicate with storage device reliability rating software 150 executing on the local computer system and/or on one or more remote computer systems, e.g., in order to receive information from the storage device reliability rating software 150 and/or to configure the storage device reliability rating software 150 with information specified by the user, such as described below. The local software that displays the GUI may also communicate with storage devices 140 in the system, e.g., to receive information regarding the storage devices and display the information on the display device.

Note that in addition to or instead of a GUI, the monitoring and controlling functionality 301 may be implemented as a command line interface (CLI) or an application programming interface (API) to display, monitor and control various aspects of the storage reliability rating software.

In 303, user input specifying criteria affecting the reliability ratings for storage device groups may be received to the graphical user interface. In various embodiments, the graphical user interface may allow the user to specify various kinds of criteria. For example, as described above, in some embodiments the storage device reliability rating software 150 may rate the reliability of a storage device group based on failure information for the storage devices in the group. Thus, the graphical user interface may allow the user to specify criteria for using the failure information to rate the storage device group's reliability.

As one simple example, the user may specify a threshold number or percentage of failures that must occur in order to cause the storage device group's reliability rating to be lowered. In one embodiment, each storage device in the group may be considered to be a "failed" storage device if the amount of failure experienced by that storage device surpasses a threshold amount. The user may be able to specify criteria regarding the threshold amount of failure used to determine whether a storage device is considered to be a failed storage device. The user may also be able to specify information regarding how many devices in a group must be designated as failed devices in order to decrease the reliability rating for the entire group and/or may specify information regarding how many devices in a group must be designated as successful devices in order to increase the reliability rating for the entire group.

In another embodiment, each storage device in the group may be assigned a score indicating how well the storage device has functioned, e.g., how many failures have occurred on the storage device. In this embodiment, the determination of whether to change the reliability rating for the entire group may be made based on the scores of the storage devices in the group. The user may be able to specify criteria used to determine each storage device's score and/or criteria affecting how the scores are used to determine the reliability rating for the group as a whole.

The user may also be able to select or specify which kinds of failures to take into account in rating the storage device group's reliability rating. For example, the user may specify that certain kinds of I/O failures are to be considered as failures for the purpose of determining the storage device group's reliability rating, while other kinds of I/O failures should be ignored. The user may also be able to specify respective weightings given to different kinds of failures when determining the reliability rating.

In other embodiments the graphical user interface may allow the user to specify other types of information affecting the rating of the storage device groups. For example, in one embodiment the user may select which operational characteristics other than failure information, if any, to use in determining the reliability ratings. The graphical user interface may allow the user to specify different rating criteria for different kinds of storage devices. In other embodiments, other types of interfaces may be employed for the purposes described above, such as a command line interface or application programming interface.

As described above, the storage device reliability rating software 150 may monitor various reliability characteristics of the storage devices in a group and re-assign storage devices that have deviated from other storage devices in the group in one or more of the reliability characteristics to different groups. In 305, user input specifying criteria for re-assigning storage devices to different storage device groups may be received to the graphical user interface. For example, in one embodiment the user may specify or select which reliability characteristics (e.g., operating temperature, amount of power-on time, I/O operation count, etc.) to monitor and take into account when determining whether the storage devices should be re-grouped. The user may also specify criteria for using the reliability characteristic information to determine whether the storage devices should be re-grouped. For example, for each reliability characteristic, the user may specify a threshold amount or percentage by which a given storage device must differ from the average in order to consider the storage device to have deviated from other storage devices in the group.

In 307, information indicating the criteria specified by the user in 303 and 305 may be stored. The storage device reliability rating software 150 may use the stored information in performing the various operations described above.

It is noted that the user input described above is intended to be exemplary only. In various embodiments the user may specify any kind of information affecting operation of the storage device reliability rating software 150. For example, the user may specify any kind of information to tune the reliability ratings of the storage device groups, e.g., depending on the particular reliability rating algorithm or heuristic used by the storage device reliability rating software in a particular embodiment. The user may also specify various other kinds of information, such as a time interval indicating how often the storage device groups should be analyzed to set their reliability ratings or change the groupings or may specify information affecting the frequency for monitoring operational characteristics and reliability characteristics of the storage devices or affecting how much information to gather regarding the operational characteristics and reliability characteristics.

Figure 6:
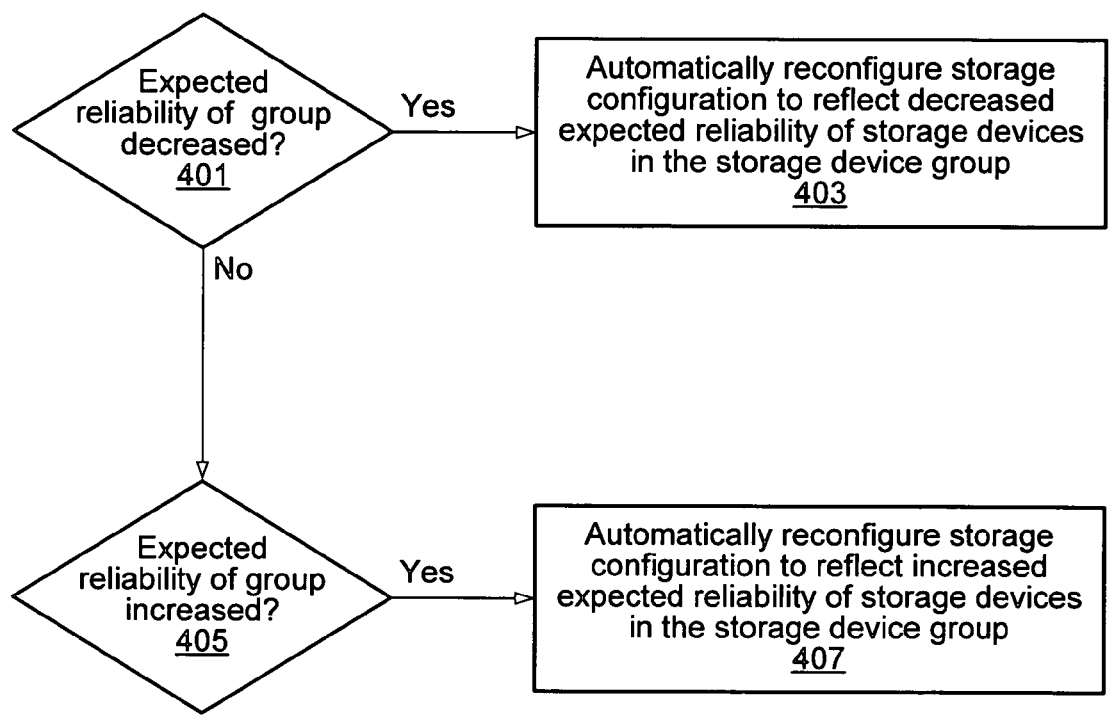
FIG. 6 is a flowchart diagram illustrating one embodiment of a method for automatically changing a storage configuration in order to reflect a decrease or increase in the expected reliability of a particular storage device group.

As mentioned above, in some embodiments, information indicating the reliability ratings for the storage device groups may be used to automatically perform various storage management operations. For example, FIG. 6 is a flowchart diagram illustrating one embodiment of a method for automatically changing a storage configuration of the system in order to reflect a decrease or increase in the expected reliability of a particular storage device group.

As indicated in 401 and 403, if the expected reliability of the group was decreased then a storage configuration of the system may be automatically reconfigured to reflect the decreased expected reliability of the storage devices in the storage device group. For example, storage management software 148 may communicate with the storage device reliability rating software 150 to receive information indicating that the expected reliability of the group has decreased, and may automatically reconfigure storage in response. For example, for at least one of the storage devices in the group, the storage management software 148 may automatically increase the redundancy of data stored on the storage device, e.g., by mirroring the data onto an additional storage device. As another example, for at least one of the storage devices in the group, the storage management software 148 may automatically move data stored on the storage device to another storage device in a different group, e.g., a group with a higher reliability rating. As another example, the storage management software 148 may automatically back up data stored on one or more of the storage devices onto another storage device. In other embodiments the storage management software 148 may automatically perform any of various other kinds of operations in order to protect data stored on storage devices in a group whose reliability rating has been lowered.

Similarly, if the expected reliability of the storage device group was increased then a storage configuration of the system may be automatically reconfigured to reflect the increased expected reliability of the storage devices in the storage device group. For example, for at least one of the storage devices in the group, the storage management software 148 may automatically decrease the redundancy of data stored on the storage device, e.g., by removing one or more mirrors of the data. This may have the benefit of freeing up more storage capacity on the more reliable storage devices. As another example, the storage management software 148 may copy data from a storage device in a group with a lower reliability rating onto one of the storage devices in the group whose reliability rating increased.

In some embodiments, one or more of the storage devices in the group may comprise disk drives configured in a RAID (Redundant Array of Independent Disks) configuration. In response to a reliability rating change that affects one or more of the disk drives in the RAID configuration, the storage management software 148 may change the RAID configuration, e.g., by increasing the RAID redundancy level by adding additional parity columns or adding an additional mirror device to reflect decreased expected reliability, or by decreasing the RAID redundancy level by removing a mirror device or reducing the number of parity columns to reflect increased expected reliability, etc.

Figure 7:
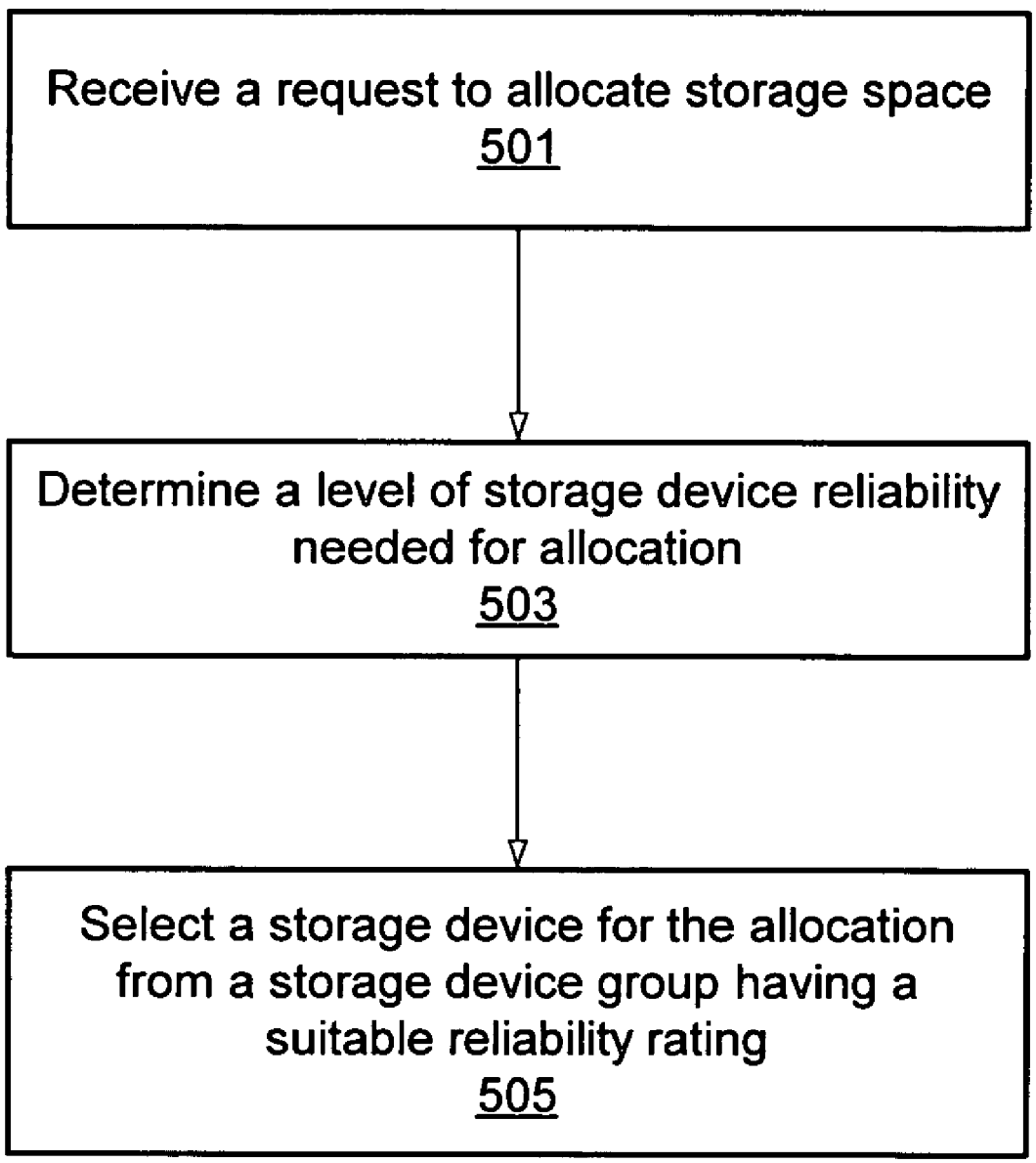
FIG. 7 is a flowchart diagram illustrating one embodiment of a method for selecting a storage device for performing an I/O operation based on the reliability ratings of storage device groups.

The storage management software 148 may also use the reliability ratings of the storage device groups to decide which storage device to select for performing a particular I/O operation or to decide which storage device to select for storing a particular portion of data. For example, as indicated in 501 of the flowchart of FIG. 7, the storage management software 148 may receive a request to allocate storage space to perform an I/O operation, e.g., a request to store data. In 503, the storage management software 148 may determine a level of storage device reliability needed for the I/O operation. In 505, the storage management software 148 may select, from a storage device group having a suitable reliability rating, a storage device from which to allocate storage space for performing the I/O operation.

For example, where the I/O request comprises a request to store data, the request may specify how critical the data to be stored is, or the storage management software 148 may be able to otherwise determine how critical the data to be stored is. For less critical data the storage management software 148 may select a storage device from a storage device group with a relatively low reliability rating, whereas for more critical data the storage management software 148 may select a storage device from a storage device group with a higher reliability rating. As another example, if the data is temporary data that only needs to be stored for a relatively short period of time then the storage management software 148 may select a storage device from a storage device group with a relatively low reliability rating, whereas for data to be archived for longer time periods, the storage management software 148 may select a storage device from a storage device group with a higher reliability rating.

In another embodiment, data and storage devices may be assigned to particular storage classes. When selecting a storage device on which to store data, a storage device from a desired storage class may be selected. In this embodiment, the particular class to which a storage device is assigned may be changed in response to a change in the storage device's reliability rating. In response to the change in the class of the storage device, data on the storage device may need to be moved to another storage device that is in the correct class, e.g., the same class to which the data is assigned. Thus, in one embodiment the data may be automatically moved to a storage device with a matching class if a change in group reliability rating causes a particular storage device's class to change.

It is noted that the reliability rating techniques described above may also be applied to other kinds of devices in addition to storage devices. For example, in one embodiment a method similar to the method of FIG. 1 may be applied to a group of computing devices. As used herein, the term "computing device" is intended to have the full breadth of its ordinary meaning. In particular, the term "computing device" includes any device that has at least one processor and at least one memory.

For example, a reliability rating for the group of computing devices may be assigned to an initial rating. Information indicating failure statistics or other operational characteristics for one or more of the computing devices in the group may be received and analyzed to determine whether the reliability rating for the group of computing devices should be changed, e.g., to indicate either a decrease or increase in the expected reliability for the computing devices in the group. If so, then the reliability rating for the group of computing devices may be changed to a different rating.

It is noted that various embodiments may further include receiving, sending or storing instructions and/or data implemented in accordance with the foregoing description upon a computer-accessible storage medium. Generally speaking, a computer-accessible storage medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-accessible storage medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for rating reliability of storage devices, the method comprising:
   assigning a reliability rating for a first group of storage devices to a first rating, wherein the first group of storage devices includes a first storage device and one or more other storage devices, wherein the first rating indicates an expected reliability that is the same for each individual one of the storage devices in the first group;
   receiving first information indicating one or more operational characteristics for one or more of the storage devices in the first group; and
   in response to said receiving, changing the reliability rating for the first group of storage devices to a second rating different from the first rating, wherein the second rating indicates an expected reliability that is the same for each individual one of the storage devices in the first group;
   wherein said changing the reliability rating for the first group of storage devices to the second rating indicates that the expected reliability for all storage devices in the first group, including the first storage device, has changed, even though the one or more operational characteristics prompting the change to the reliability rating do not apply to the first storage device.

2. The computer implemented method of claim 1, further comprising:
   analyzing the first information to determine whether to change the reliability rating for the first group of storage devices;
   wherein the reliability rating for the first group of storage devices is changed to the second rating in response to said analyzing.

3. The computer implemented method of claim 1, wherein the first information indicating the one or more operational characteristics for the one or more storage devices in the first group comprises information indicating failure statistics for the one or more storage devices, wherein the reliability rating for the first group of storage devices is changed to the second rating based on the failure statistics.

4. The computer implemented method of claim 1, wherein the second rating indicates that the expected reliability for each of the storage devices in the first group has decreased relative to the first rating.

5. The computer implemented method of claim 4,
   wherein the first information indicates that the first storage device has not experienced any failures and indicates that the one or more other storage devices have experienced one or more failures;
   wherein said changing the reliability rating for the first group of storage devices to the second rating indicates that the expected reliability for the first storage device has decreased, based on the one or more failures experienced by the one or more other storage devices in the first group.

6. The computer implemented method of claim 1, wherein the second rating indicates that the expected reliability for each of the storage devices in the first group has increased relative to the first rating.

7. The computer implemented method of claim 1, further comprising:
   grouping the storage devices together into the first group, wherein said grouping the storage devices together into the first group is performed according to one or more characteristics indicating that the storage devices have similar expected reliabilities.

8. The computer implemented method of claim 7, wherein the one or more characteristics indicating that the storage devices have similar expected reliabilities comprise information indicating that the storage devices are from a common manufacturing batch.

9. The computer implemented method as recited in claim 7, wherein the one or more characteristics indicating that the storage devices have similar expected reliabilities comprise one or more operational characteristics of the storage devices.

10. The computer implemented method of claim 1, further comprising:
    monitoring one or more reliability characteristics of the storage devices in the first group; and
    assigning a first subset of the storage devices to a second group instead of the first group in response to determining that storage devices in the first subset have deviated from other storage devices in the first group in at least one of the one or more reliability characteristics.

11. The computer implemented method of claim 10, wherein said monitoring the one or more reliability characteristics of the storage devices in the first group comprises monitoring one or more of:
    temperature information for the storage devices;
    amount of operating time for the storage devices;
    numbers of read operations performed by the storage devices; and/or
    numbers of write operations performed by the storage devices.

12. The computer implemented method of claim 1, wherein the reliability rating for the first group of storage devices is changed to the second rating in response to determining that the one or more operational characteristics for the one or more storage devices in the first group are different from expected operational characteristics.

13. The computer implemented method of claim 1, wherein the reliability rating for the first group of storage devices is changed to the second rating in response to determining that a first operational characteristic for one or more storage devices in the first group differs by more than a threshold amount from a first value.

14. The computer implemented method of claim 1, wherein the storage devices comprise one or more of:
    disk drives;
    tape drives; and/or
    optical drives.

15. A data storage system comprising:
    at least one processor; and
    a first storage device and one or more other storage devices;
    wherein the at least one processor is operable to execute program instructions in order to:
        assign a reliability rating for a first group of the storage devices to a first rating, wherein the first group includes the first storage device and the one or more other storage devices, wherein the first rating indicates an expected reliability for each of the storage devices in the first group;
        receive first information indicating one or more operational characteristics for one or more of the storage devices in the first group; and
        change the reliability rating for the first group of storage devices to a second rating based on the first information, wherein changing the reliability rating for the first group indicates that the expected reliability for each of the storage devices in the first group has changed;
        wherein the change to the reliability rating for the first group of storage devices to the second rating indicates that the expected reliability for all storage devices in the first group, including the first storage device, has changed, even though the one or more operational characteristics prompting the change to the reliability rating do not apply to the first storage device.

16. The data storage system of claim 15, wherein the first information indicating the one or more operational characteristics for the one or more storage devices in the first group comprises information indicating failure statistics for the one or more storage devices, wherein the reliability rating for the first group of storage devices is changed to the second rating based on the failure statistics.

17. The data storage system of claim 15, wherein the second rating indicates that the expected reliability for each of the storage devices in the first group has decreased relative to the first rating; and
    in response to changing the reliability rating for the first group of storage devices to the second rating, the data storage system is further configured to:
        increase the redundancy of data stored on the storage devices in the first group; or
        move all or part of the data from the first group of storage devices to a second group of storage devices with a higher reliability rating.

18. The data storage system of claim 17,
    wherein the first information indicates that the first storage device has not experienced any failures and indicates that the one or more other storage devices have experienced one or more failures;
    wherein said changing the reliability rating for the first group of storage devices to the second rating indicates that the expected reliability for the first storage device has decreased, based on the one or more failures experienced by the one or more other storage devices in the first group.

19. The data storage system of claim 15, wherein the second rating indicates that the expected reliability for each of the storage devices in the first group has increased relative to the first rating.

20. A computer-implemented method for rating reliability of computing devices, the method comprising:
    assigning a reliability rating for a first group of computing devices to a first rating, wherein the first group of computing devices includes a first computing device and one or more other computing devices wherein the first rating indicates an expected reliability that is the same for each individual one of the computing devices in the first group;
    receiving first information indicating one or more operational characteristics for one or more of the computing devices in the first group; and
    in response to said receiving, changing the reliability rating for the first group of computing devices to a second rating different from the first rating, wherein the second rating indicates an expected reliability that is the same for each individual one of the computing devices in the first group;
    wherein said changing the reliability rating for the first group of computing devices to the second rating indicates that the expected reliability for all computing devices in the first group, including the first computing device, has changed, even though the one or more operational characteristics prompting the change to the reliability rating do not apply to the first computing device.

* * * * *

UNITED STATES PATENT AND TRADEMARK OFFICE
CERTIFICATE OF CORRECTION

PATENT NO. : 7,580,956 B1  Page 1 of 1
APPLICATION NO. : 11/418358
DATED : August 25, 2009
INVENTOR(S) : Xin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Fourteenth Day of September, 2010

David J. Kappos
*Director of the United States Patent and Trademark Office*